UNITED STATES PATENT OFFICE.

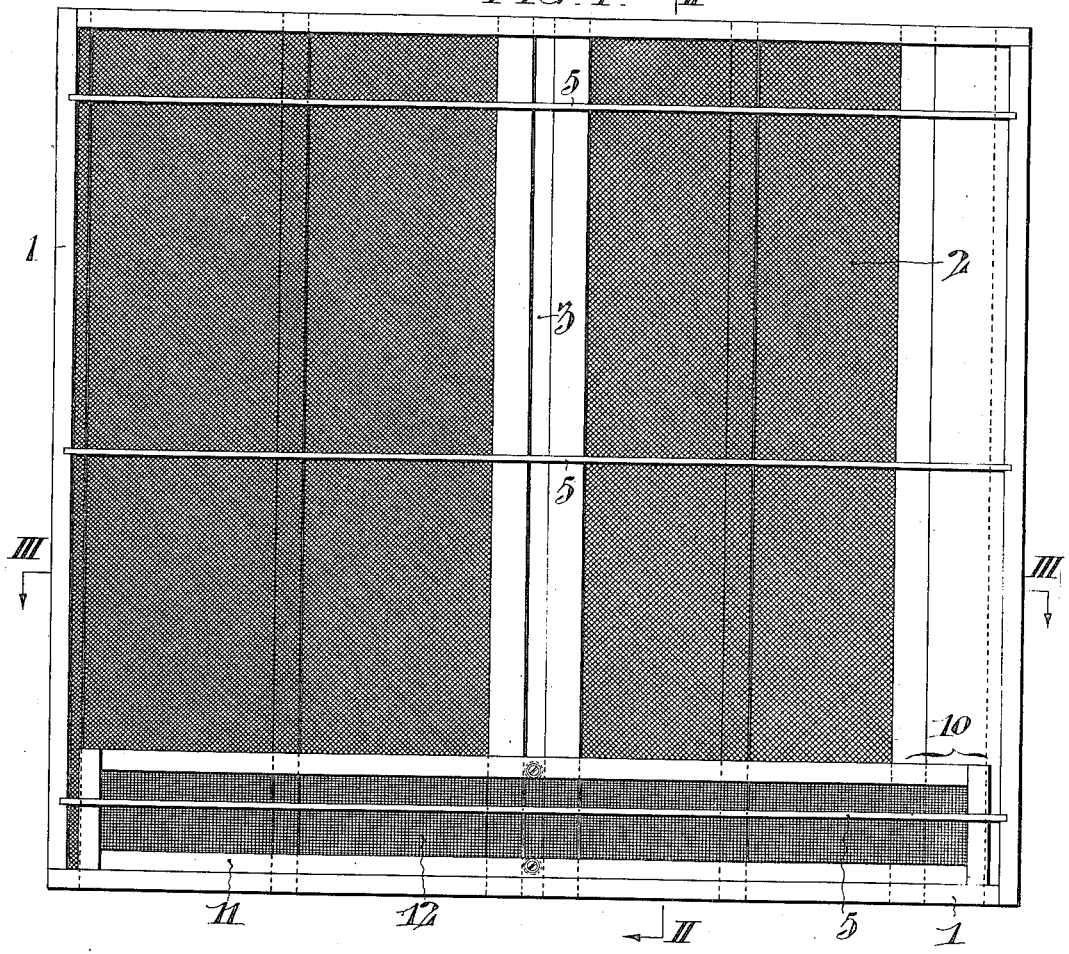
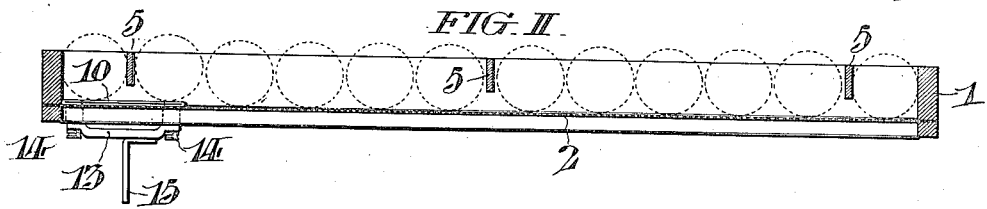
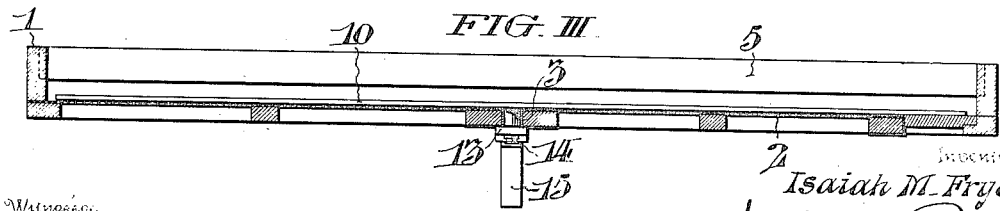

ISAIAH M. FRYE, OF HARRISONBURG, VIRGINIA.

EGG-TURNER.

1,222,617.   Specification of Letters Patent.   Patented Apr. 17, 1917.

Application filed October 21, 1915. Serial No. 57,032.

*To all whom it may concern:*

Be it known that I, ISAIAH M. FRYE, of Harrisonburg, in the county of Rockingham and State of Virginia, have invented certain new and useful Improvements in Egg-Turners, whereof the following is a specification, reference being had to the accompanying drawings.

The invention relates to an egg turner for incubator trays.

Heretofore it has been customary to turn the eggs in a tray by a movable bottom or other movable means extending across the entire surface of the tray, and which, when shifted, turns all the eggs simultaneously. It has been found, however, that when all the eggs are turned at once, they tend to shift in the direction in which they are turned, and after they have been turned a few times, they become bunched and crowded which interferes with their subsequent turning and prevents proper incubation. In order to prevent this shifting, separating strips or frames of lattice work have been placed across the trays which hold the eggs in their proper places. To be effective, however, these strips must be placed between every two rows of eggs at least. This not only increases the cost of construction, but also reduces the capacity of the tray. Attempts have also been made to turn the eggs by shifting the lattice work, but this results in shoving rather than rotating the eggs, and still further reduces the capacity of the tray in order to provide space for shifting of the lattice work.

It is the object of my invention to avoid these difficulties, and provide a means for turning the egs which will eliminate, or at least greatly reduce the tendencies of shifting and bunching, and minimize the number of separating strips required.

To this end, I provide a turning strip which extends across the entire width of the tray, but which instead of extending the entire length of the tray is quite narrow, so that it will only engage a few of the eggs at a time. This strip is adapted to slide across the bottom of the tray, and turns the rows of eggs successively as it engages them.

Referring to the accompanying drawings,

Figure I, is a plan view of an incubator tray, illustrating my improvements.

Figs. II, and III, are sectional views, indicated respectively at II, II, and III, III, in Fig. I.

Fig. IV, is a detail cross sectional view through the turning strip, on an enlarged scale.

I prefer to construct my incubator tray of a rectangular frame 1, the bottom of which is covered with a wire netting 2, which is rigidly supported by strips 4, and arranged to leave a slot 3, running the entire length of the tray, and having rigid edges formed by said supporting strips. The eggs are placed directly on the wire netting 2, in rows with their longer axes at right angles to the slot 3, as best shown in Fig. II. Occasional cross bars 5, are fixed in the frame 1, also arranged to run at right angles to the slot, so as to keep the eggs in proper alinement.

I provide a turning strip 10, which may be composed of a thin metallic frame 11, covered with a wire netting or similar substance 12, so as to form a foraminous strip. This turning strip extends across practically the entire width of the tray, but is relatively narrow and adapted to slide over the entire length of the wire surface 2, and is substantially rigid in its plane of action. Cross head 13, is attached to strip 10, by means of screws 14, and is adapted to engage slot 3, and keep strip 10, close to surface and also keeps the strip at right angles to the slot. Handle 15, which may be of any convenient form or substance, is attached to cross head 14, and provides means for moving strip 10, from beneath the tray.

The surface 12, of turning strip 10, may be composed of wire netting, or metallic web, or other similar material, provided it is sufficiently rough to cause frictional engagement between the lower surface of the eggs and the upper surface of the strip 10. Consequently, when the eggs are placed in the tray as shown in Fig. II, so as to be incapable of lateral movement, any movement of strip 10, across the tray will cause the eggs to rotate, as long as the surface of the egg is in engagement with surface of strip 10.

The amount which the eggs are turned may, therefore, be varied by using strips of different widths. I have found, however, that the best results are obtained by turning the egg almost, but not quite half way over. For in this way every portion of the egg will in turn be directly exposed to the source of heat. I, therefore, provide that the width of the strip 10, shall be such as to turn the eggs almost half way over.

In operation, the eggs are placed in the tray, as described, with their long axes perpendicular to slot 3, and the direction in which turning strip 10, moves. In order to turn the eggs, it is merely necessary to move the strip across the tray until all the rows of eggs have been successively turned. Strip 10, is moved by means of handle which, as has been explained, depends below the tray. The operation may be effected by hand or any other suitable method of engagement of the handle 15.

In this way, each row of eggs is slightly raised and separated from the others, as it is turned, which greatly decreases the friction between the rows, and increases the tendency of the eggs to turn. Since only a small part of the eggs are turned at a time, there is no general lateral movement of the eggs at the time of turning, and, therefore, a reduction of the tendency of the eggs to slide. This enables me to reduce the number of cross bars 5, to a minimum, there being merely enough to preserve the general alinement of the eggs.

The fact that only a few eggs are turned at a time, also enables the eggs to be turned with the expenditure of very much less energy, a feature which is of great importance, especially in machines where there are a number of trays.

I, therefore, provide an exceedingly simple and efficient egg tray which may be manufactured at a very low cost, and which may be used in connection with any incubator either singly or adapted to any general scheme of turning where a plurality of trays are used.

The terms "length" and "width" when referring to the dimensions of the tray have been used by me, not to indicate that one side is longer than the other, which is obviously immaterial. but to designate those directions which are parallel and perpendicular to the slot 3, respectively.

Having thus described my invention, I claim:

1. A tray for incubators comprising, an outer frame, a surface on which eggs are supported, and relatively narrow means adapted to slide across the top of said surface beneath the eggs, whereby the eggs are successively turned a few at a time.

2. A tray for incubators comprising, an outer frame, a surface on which eggs are supported having a slot extending lengthwise thereof, and a narrow strip extending across the width of said surface, engaging said slot and adapted to slide lengthwise of said surface.

3. A tray for incubators comprising an outer frame; a surface on which eggs are supported having a lengthwise slot; a narrow strip extending across the width of said surface, adapted to slide lengthwise of said surface; and means attached to said strip engaging said slot, whereby said strip is always held at right angles to said slot.

4. A tray for incubators comprising, an outer frame, a surface on which eggs are supported having a lengthwise slot, a narrow strip extending across the width of said surface, and means attached to said strip engaging said slot, said means extending through said slot and below the tray, whereby the strip may be moved across the length of said surface.

5. A tray for incubators comprising an outer frame, a surface on which the eggs are supported having a lengthwise slot, a narrow strip extending across the width of said surface, a cross head attached to said strip adapted to engage said slot, and a handle attached to said cross head depending below said tray, whereby the strip may be moved lengthwise of said surface.

6. In an incubator tray, the combination of a level surface for supporting the eggs; means for rigidly supporting said surface; egg turning means supported on said surface and adapted to slide over said surface beneath the eggs, whereby a movement of rotation is imparted to the eggs, said egg turning means being substantially rigid in its plane of action.

7. In an incubator tray, the combination of a surface for supporting the eggs; means for rigidly supporting said surface; a foraminous strip supported by said surface and adapted to slide over said surface beneath the eggs, whereby movement of rotation is imparted to the eggs, said strip being substantially rigid in its plane of action.

8. In an incubator tray, the combination of a surface for supporting the eggs, said surface being rigidly supported and having a lengthwise slot; egg turning means supported by said surface adapted to engage said slot and to slide over said surface beneath the eggs, whereby a movement of rotation is imparted to the eggs, the said egg turning means being substantially rigid in its plane of action.

9. In an incubator tray, the combination of a surface for supporting the eggs, having a lengthwise slot; means for rigidly supporting said surface, said means being adapted to form rigid edges for said slot; egg turning means adapted to slide over said surface; means depending from said egg turning means adapted to engage the edges of said slot in such a manner as to hold the egg turning means at right angles to said slot.

In testimony whereof, I have hereunto signed my name, at Harrisonburg, Virginia, this eighteenth day of October 1915.

ISAIAH M. FRYE.

Witnesses:
P. S. MARTIN,
W. F. SHAVER.